US012561543B2

(12) United States Patent (10) Patent No.: US 12,561,543 B2

Miyazawa (45) Date of Patent: Feb. 24, 2026

(54) CARD READER

(71) Applicant: NIDEC INSTRUMENTS CORPORATION, Nagano (JP)

(72) Inventor: Shinya Miyazawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 19/057,983

(22) Filed: Feb. 20, 2025

(65) Prior Publication Data

US 2025/0265433 A1 Aug. 21, 2025

(30) Foreign Application Priority Data

Feb. 21, 2024 (JP) ................................. 2024-024191

(51) Int. Cl.
*G06K 7/00* (2006.01)
*G06K 13/08* (2006.01)

(52) U.S. Cl.
CPC ....... *G06K 13/0893* (2013.01); *G06K 7/0056* (2013.01)

(58) Field of Classification Search
CPC .. G06K 13/0893; G06K 7/0056; G06K 13/06; G06K 13/08
See application file for complete search history.

(56) References Cited

U.S. PATENT DOCUMENTS

| | | | | |
|---|---|---|---|---|
| 6,042,010 A * | 3/2000 | Kanayama | ............. | G06K 7/084 |
| | | | | 235/379 |
| 7,350,705 B1 * | 4/2008 | Frederick | ............. | G06K 7/0021 |
| | | | | 235/475 |
| 8,418,917 B1 * | 4/2013 | Lewis | ....................... | G07F 7/10 |
| | | | | 235/475 |
| 9,697,390 B2 | 7/2017 | Kuwaki | | |
| 2008/0060908 A1 * | 3/2008 | Abe | ........................ | G06K 13/08 |
| | | | | 194/344 |
| 2017/0185812 A1 * | 6/2017 | Ozawa | ................... | G06K 13/08 |
| 2024/0160864 A1 * | 5/2024 | Uchiyama | ............ | G06K 7/0013 |

FOREIGN PATENT DOCUMENTS

| | | | | | |
|---|---|---|---|---|---|
| EP | 0917092 A2 * | 5/1999 | | ............. | G06K 13/08 |
| EP | 1367531 A2 * | 12/2003 | | ......... | G06K 13/0875 |
| WO | WO-0075861 A1 * | 12/2000 | | ........... | G06K 7/0021 |

* cited by examiner

*Primary Examiner* — Tuyen K Vo

(74) *Attorney, Agent, or Firm* — HAUPTMAN HAM, LLP

(57) ABSTRACT

A card reader includes a data reading mechanism and a main body frame formed with a card moving passage and holding the data reading mechanism. The main body frame is formed with a moving passage forming surface, an accommodation part recessed from the moving passage forming surface toward a lower side, and a guide part for guiding a foreign matter inserted from a card insertion slot to the accommodation part. The accommodation part is disposed at a position displaced from the data reading mechanism in a width direction of a card and is disposed on a lower side in a vertical direction with respect to the card contacting the moving passage forming surface. The foreign matter is capable of being guided from the front side with respect to the data reading mechanism toward the accommodation part by the guide part.

12 Claims, 5 Drawing Sheets

CARD READER

CROSS REFERENCE TO RELATED APPLICATION

The present invention claims priority under 35 U.S.C. § 119 to Japanese Application No. 2024-024191 filed Feb. 21, 2024, the entire content of which is incorporated herein by reference.

TECHNICAL FIELD

At least an embodiment of the present invention may relate to a card reader.

BACKGROUND ART

Conventionally, a card reader has been known in which a card is manually operated by a user to perform reading of data recorded in the card and recording to the card (for example, see Japanese Patent Laid-Open No. 2015-92307 (Patent Literature 1)). The card reader described in Patent Literature 1 includes a magnetic head for performing reading of magnetic data recorded in a card, an IC contact block for performing communication of data with an IC chip incorporated into the card, and a main body frame in which a card moving passage where the card is moved is formed. The main body frame is provided with a card accommodating part formed in a bag shape in which a part of a card inserted from a card insertion slot is accommodated.

In the card reader described in Patent Literature 1, the card accommodating part is formed with an opening part in which an IC contact block is disposed, and a second opening part for leading out a cable connected with the IC contact block. The second opening part is formed on a rear side with respect to the opening part. Further, a recessed part is formed in the card accommodating part at a position facing the second opening part. In the card reader described in Patent Literature 1, a relatively wide space is formed in a rear side portion of the card accommodating part by the second opening part and the recessed part and thus, dust and dirt entered into the rear side portion of the card accommodating part can be discharged to the outside of the card reader together with liquid.

As described above, in the card reader described in Patent Literature 1, dust and dirt entered into a rear side portion of the card accommodating part can be discharged to the outside of the card reader. On the other hand, in the card reader described in Patent Literature 1, for example, when a relatively large foreign matter such as a coin is inserted from a card insertion slot, the card accommodating part may be clogged by the foreign matter. When the card accommodating part is clogged by a foreign matter, a card is unable to be inserted from the card insertion slot, and thereafter, transactions of a card may be unable to be performed in the card reader.

SUMMARY

In view of the problem described above, at least an embodiment of the present invention may advantageously provide a card reader which is, even when a relatively large foreign matter is inserted from a card insertion slot, capable of continuing a transaction of a card thereafter.

According to at least an embodiment of the present invention, there may be provided a card reader including a data reading mechanism which is in contact with a card and at least reads data recorded in the card, and a main body frame which is formed with a card moving passage where the card inserted from a card insertion slot is moved and holds the data reading mechanism. When a direction perpendicular to a movement direction of the card which is linearly moved along the card moving passage and perpendicular to a thickness direction of the card moved along the card moving passage is defined as a width direction of the card, one side in the movement direction of the card is referred to as a front side, an opposite side to the front side is referred to as a rear side, one side in the thickness direction of the card is referred to as a first thickness direction side, and an opposite side to the first thickness direction side is referred to as a second thickness direction side, the card is inserted into the card insertion slot from the front side toward the rear side, the main body frame is formed with a moving passage forming surface which is a face of the card moving passage on the first thickness direction side, an accommodation part which is recessed from the moving passage forming surface toward the first thickness direction side, and a guide part for guiding a foreign matter inserted from the card insertion slot to the accommodation part, the accommodation part is disposed at a position displaced from the data reading mechanism in the width direction of the card and is disposed on a lower side in a vertical direction with respect to the card contacting the moving passage forming surface, and the foreign matter is capable of being guided from the front side with respect to the data reading mechanism toward the accommodation part by the guide part.

In the card reader in this embodiment, when one side in a thickness direction of a card moving along the card moving passage is referred to as a first thickness direction side, the main body frame is formed with the accommodation part recessed from the moving passage forming surface which is a face on the first thickness direction side of the card moving passage toward the first thickness direction side, and the accommodation part is disposed at a position displaced from the data reading mechanism in the width direction of the card and is disposed on a lower side in a vertical direction with respect to the card contacting the moving passage forming surface. Further, in this embodiment, the main body frame is formed with the guide part for guiding a foreign matter inserted from the card insertion slot to the accommodation part, and the foreign matter can be guided from the front side with respect to the data reading mechanism toward the accommodation part by the guide part.

Therefore, in this embodiment, even when a relatively large foreign matter is inserted from the card insertion slot, the foreign matter can be accommodated in the accommodation part which is disposed at a position where hindrance hardly occurs in reading and the like of data by the data reading mechanism, and clogging in the card moving passage can be prevented by accommodating the foreign matter in the accommodation part. Therefore, in this embodiment, even when a relatively large foreign matter is inserted from the card insertion slot, the card reader is capable of continuing transactions of a card thereafter.

Effects of the Invention

As described above, in the card reader in accordance with an embodiment of the present invention, even when a relatively large foreign matter is inserted from the card insertion slot, transactions of a card thereafter are capable of being continued.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

Entire Structure of Card Reader

Figure 1:
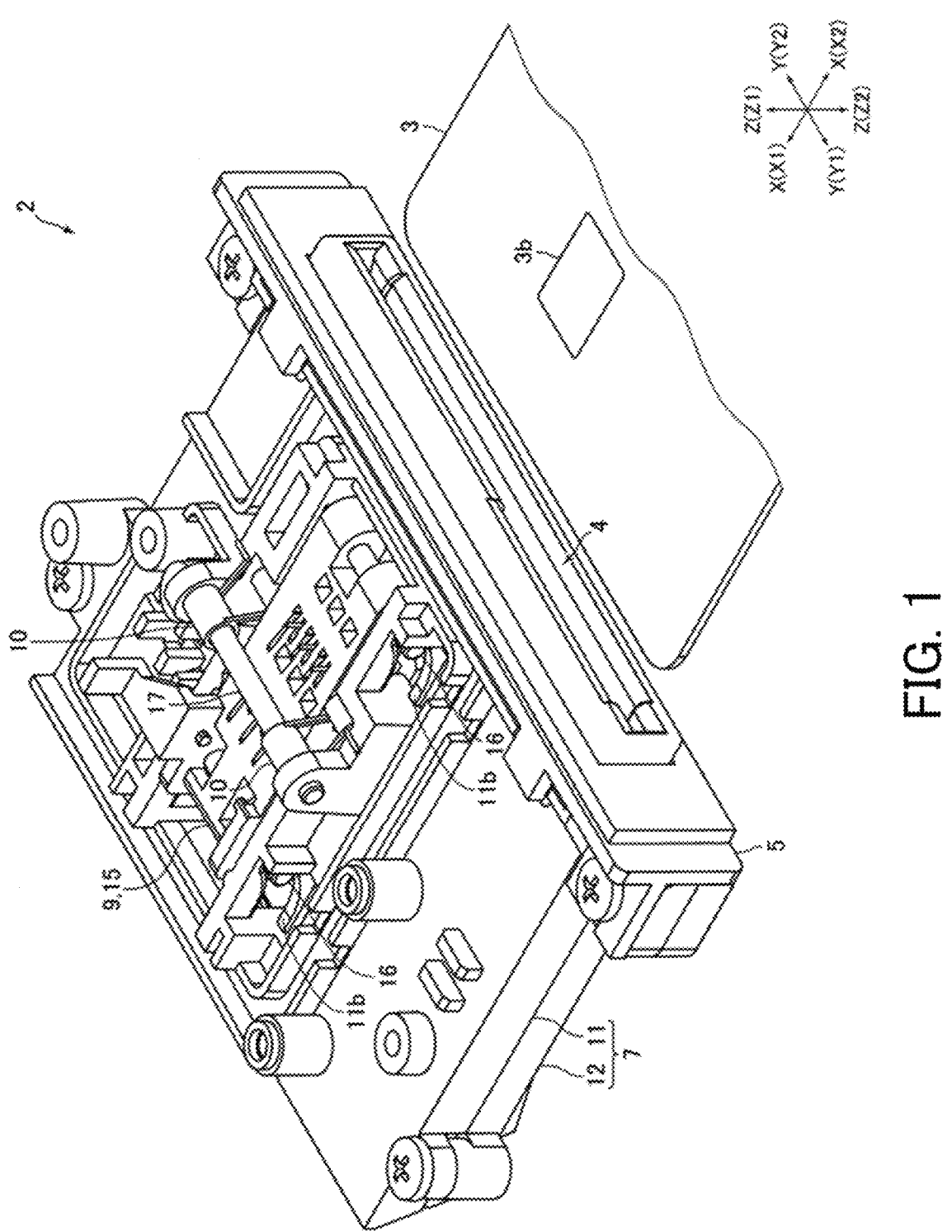
FIG. 1 is a perspective view showing a card reader in accordance with an embodiment of the present invention.
Figure 2:
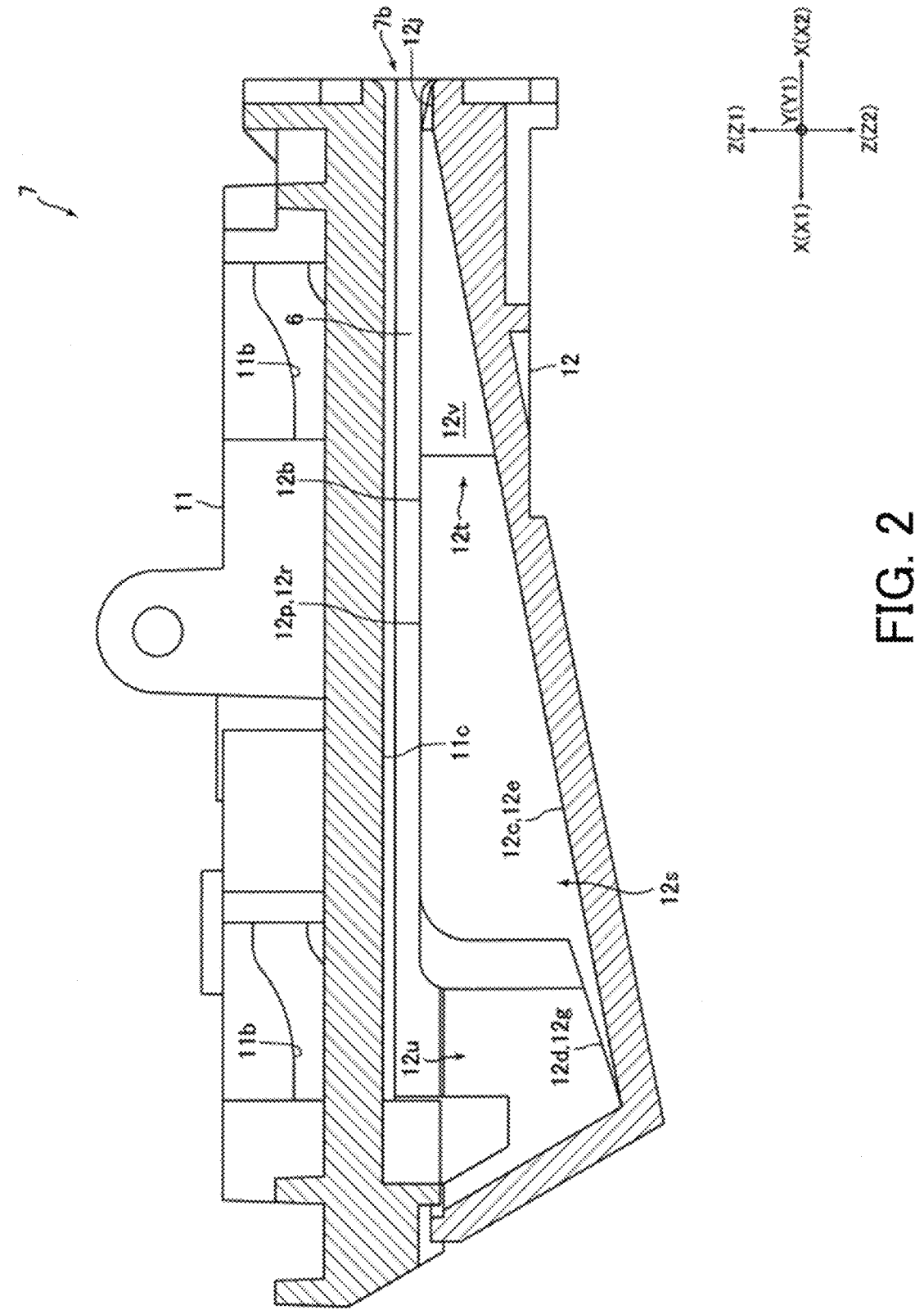
FIG. 2 is a cross-sectional view showing a main body frame in FIG. 1.
Figure 3:
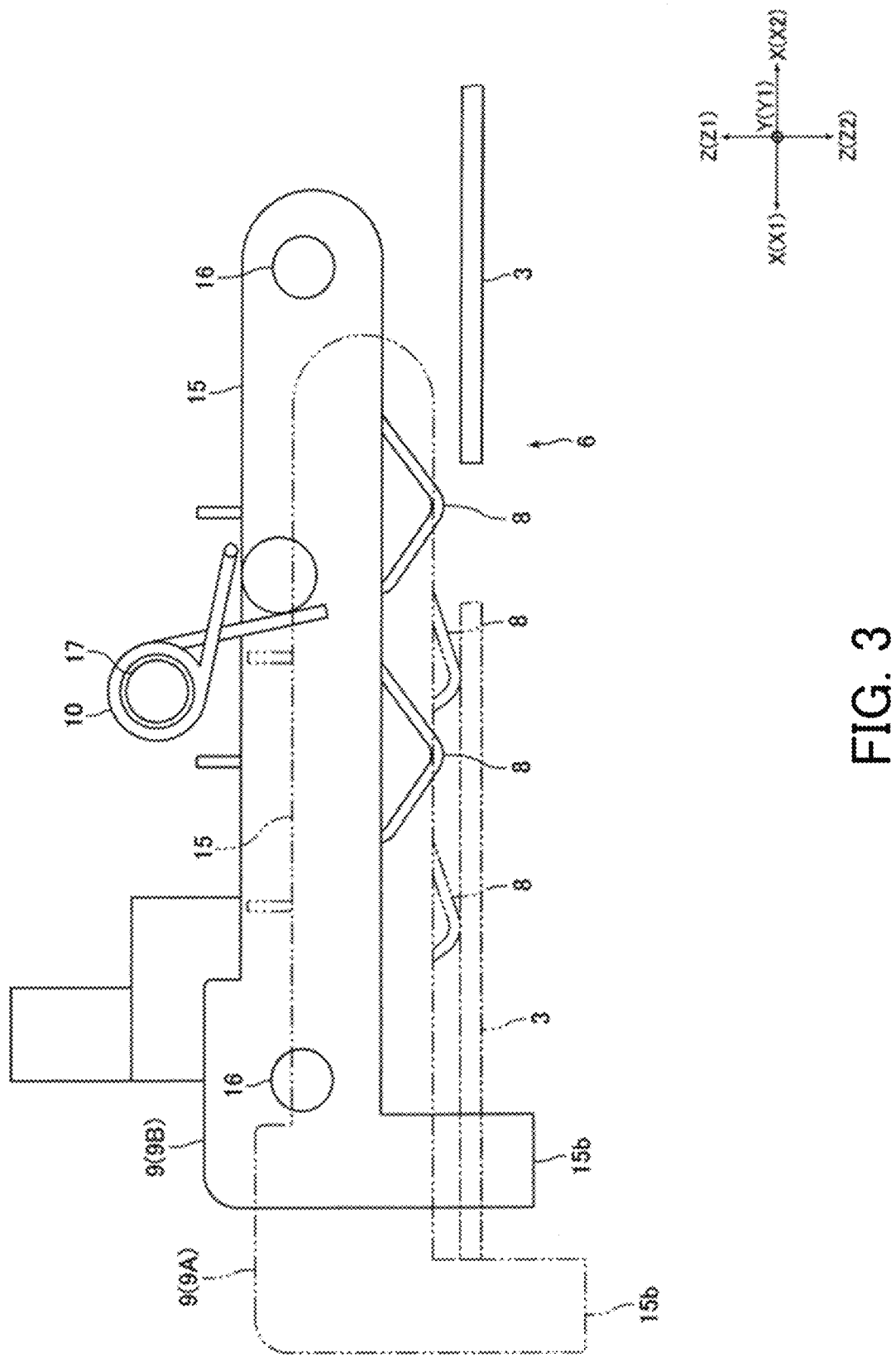
FIG. 3 is an explanatory side view showing an operation of an IC contact block shown in FIG. 1.

FIG. 1 is a perspective view showing a card reader 2 in accordance with an embodiment of the present invention. FIG. 2 is a cross-sectional view showing a main body frame 7 in FIG. 1. FIG. 3 is an explanatory side view showing an operation of an IC contact block 9 shown in FIG. 1.

A card reader 2 in this embodiment is a device for performing reading of data recorded in a card 3 and recording data to the card 3. Specifically, the card reader 2 is a so-called dip type card reader which performs reading and recording of data by manually performing insertion of a card 3 to the card reader 2 and pulling-out of the card 3 from the card reader 2. The card reader 2 is mounted and used in a predetermined host apparatus. The card 3 is, for example, a card made of vinyl chloride whose thickness is about 0.7-0.8 mm. The card 3 is formed in a rectangular shape. An IC chip is incorporated into the card 3, and one face of the card 3 is formed with an external connection terminal 3b of the IC chip. The card 3 may be a metal card.

The card reader 2 includes a bezel 5 which is formed with a card insertion slot 4 into which a card 3 is inserted, and a main body frame 7 which is formed with a card moving passage 6. A card 3 inserted from the card insertion slot 4 is moved along the card moving passage 6. Further, the card reader 2 includes an IC contact block 9 having a plurality of IC contact springs 8 which are capable of contacting an external connection terminal 3b of the card 3, and a torsion coil spring 10 which biases the IC contact block 9 to the main body frame 7. In other words, the card reader 2 is a contact type IC card leader. The IC contact block 9 in this embodiment is at least a data reading mechanism for reading data recorded in the card 3 by contacting the card 3.

In this embodiment, a manually operated card 3 is moved in the "X"-direction in FIG. 1 and the like. In other words, the "X"-direction is a movement direction of the card 3 which is linearly moved in the card moving passage 6. A card 3 is inserted to the "X1"-direction side in FIG. 1 which is one side in the "X"-direction and is pulled out to the "X2"-direction side in FIG. 1 which is the other side in the "X"-direction. Further, the "Z"-direction in FIG. 1 and the like perpendicular to the "X"-direction is a thickness direction of the card 3 which is linearly moved in the card moving passage 6, and the "Y"-direction perpendicular to the "X"-direction and the "Z"-direction in FIG. 1 and the like is a width direction (short width direction) of the card 3 which is linearly moved in the card moving passage 6.

In the following descriptions, for convenience of explanation, the "X"-direction is referred to as a front-rear direction, the "Y"-direction is referred to as a left-right direction, and the "Z"-direction is referred to as an upper-lower direction. Further, the "X2"-direction side which is a pulling-out direction of a card 3 from the card reader 2 is referred to as a "front" side, and the "X1"-direction side which is its opposite side (inserting direction side of a card 3 to the card reader 2) is referred to as a "back" side or a "rear" side. In other words, the "X2"-direction side which is one side in a movement direction of a card 3 is referred to as a "front" side, and its opposite side is referred to as a "back" side or a "rear" side. A card 3 is inserted to the card insertion slot 4 from the front side toward the rear side.

Further, in the following descriptions, the "Y1"-direction side in FIG. 1 and the like which is one side in the left-right direction is referred to as a "left" side, the "Y2"-direction side in FIG. 1 and the like which is its opposite side is referred to as a "right" side, the "Z1"-direction side in FIG. 1 and the like which is one side in the upper-lower direction is referred to as an "upper" side, and the "Z2"-direction side in FIG. 1 and the like which is its opposite side is referred to as a "lower" side. The lower side ("Z2"-direction side) in this embodiment is a first thickness direction side which is one side in the thickness direction of a card 3, and the upper side ("Z1"-direction side) is a second thickness direction side which is an opposite side to the first thickness direction side. Further, the left side ("Y1"-direction side) in this embodiment is a first width direction side which is one side in the width direction of a card 3, and the right side ("Y2"-direction side) is a second width direction side which is an opposite side to the first width direction side.

In this embodiment, in a state that the card reader 2 is mounted on a host apparatus, the "Z"-direction (upper-lower direction) of the card reader 2 is not completely coincided with a vertical direction, and the "Z"-direction of the card reader 2 in a state mounted on the host apparatus is slightly inclined with respect to the vertical direction. Further, in this embodiment, the "Z2"-direction side (lower side) of the card reader 2 in a state mounted on a host apparatus is approximately coincided with a "lower side in the vertical direction" (side on which gravity acts), and the "Z1"-direction side (upper side) of the card reader 2 in a state mounted on the host apparatus is approximately coincided with an "upper side in the vertical direction". However, the "Z"-direction of the card reader 2 in a state mounted on the host apparatus may be completely coincided with the vertical direction.

A shape of the main body frame 7 when viewed in the upper-lower direction is a substantially rectangular shape in which the left-right direction is its long side direction. A width in the front-rear direction of the main body frame 7 is smaller than a length (width in a longitudinal direction) of a card 3. The main body frame 7 is structured of a first frame 11 and a second frame 12 which are divided in the upper-lower direction. The first frame 11 and the second frame 12 are formed of resin. The first frame 11 structures an upper side portion of the main body frame 7, and the second frame 12 structures a lower side portion of the main body frame 7. The card moving passage 6 is formed between the first frame 11 and the second frame 12 and is formed in an inside of the main body frame 7. The bezel 5 is fixed to a front end part of the main body frame 7.

The main body frame 7 holds the IC contact block 9. Specifically, the first frame 11 movably holds the IC contact block 9. The first frame 11 is formed with an opening part in which a part of the IC contact block 9 is disposed. The opening part communicates with an inside of the main body frame 7. Further, the first frame 11 is formed with cam grooves 11b engaged with cam pins 16 described below which structure a part of the IC contact block 9. A front end part of the main body frame 7 is formed with an opening part 7b communicating with an inside of the main body frame 7. A part of a card 3 inserted from the card insertion slot 4 passes the opening part 7b. The main body frame 7 is formed in a bag shape which has no opening part except the opening part where a part of the IC contact block 9 is disposed and the opening part 7b. A specific structure of the main body frame 7 will be described below.

The IC contact block 9 is movable with respect to the main body frame 7 between a contact position 9A (position shown by the two-dot chain line in FIG. 3) where the IC contact springs 8 are capable of contacting an external connection terminal 3b of a card 3 and a retreat position 9B (position shown by the solid line in FIG. 3) where the IC contact springs 8 are retreated so as not to contact the external connection terminal 3b. The IC contact block 9 is provided with a block main body 15 which holds a plurality of the IC contact springs 8 and two cam pins 16 for guiding the IC contact block 9 between the contact position 9A and the retreat position 9B.

The block main body 15 is disposed so that the IC contact springs 8 face the card moving passage 6 from the upper side. Upper end side portions of the IC contact spring 8 are connected with a flexible printed board not shown. A front end part and a rear end part of the block main body 15 are formed with arrangement holes where the cam pins 16 are disposed. The block main body 15 is provided with a card contacting part 15b which contacts a rear end face of a card 3. The card contacting part 15b is protruded to the lower side from a rear end part of the block main body 15. The cam pin 16 is engaged with a cam groove 11b of the first frame 11. The IC contact block 9 is guided between the contact position 9A and the retreat position 9B by the cam pins 16 and the cam grooves 11b.

The torsion coil spring 10 is disposed on both outer sides with respect to the IC contact block 9 in the left-right direction. A part of a spring holding pin 17 which is attached to the first frame 11 is disposed on an inner peripheral side of the torsion coil spring 10. The torsion coil spring 10 is held by the main body frame 7 through the spring holding pin 17. One end part of the torsion coil spring 10 is engaged with the IC contact block 9, and the other end part of the torsion coil spring 10 is engaged with the block main body 15. The torsion coil spring 10 biases the IC contact block 9 toward the retreat position 9B.

When a card 3 is not inserted into the card reader 2, the IC contact block 9 is located at the retreat position 9B by biasing force of the torsion coil spring 10. The IC contact block 9 located at the retreat position 9B is disposed on the front and upper side with respect to the IC contact block 9 located at the contact position 9A. When a card 3 is inserted into the card reader 2, the card 3 which moves the card moving passage 6 toward the rear side contacts the card contacting part 15b. When the card contacting part 15b is pushed toward the rear side by the card 3 contacting the card contacting part 15b, the IC contact block 9 is moved to the contact position 9A from the retreat position 9B.

The IC contact block 9 which is structured to move from the retreat position 9B to the contact position 9A is moved toward the lower side as going to the rear side. When the IC contact block 9 reaches the contact position 9A, the IC contact springs 8 contact an external connection terminal 3b of a card 3 at a predetermined contact pressure to perform reading of data recorded in the card 3 and recording of data to the card 3. Further, when the card 3 inserted into the card reader 2 is pulled out, the IC contact block 9 located at the contact position 9A is moved to the retreat position 9B by the biasing force of the torsion coil spring 10.

Structure of Main Body Frame

Figure 4:
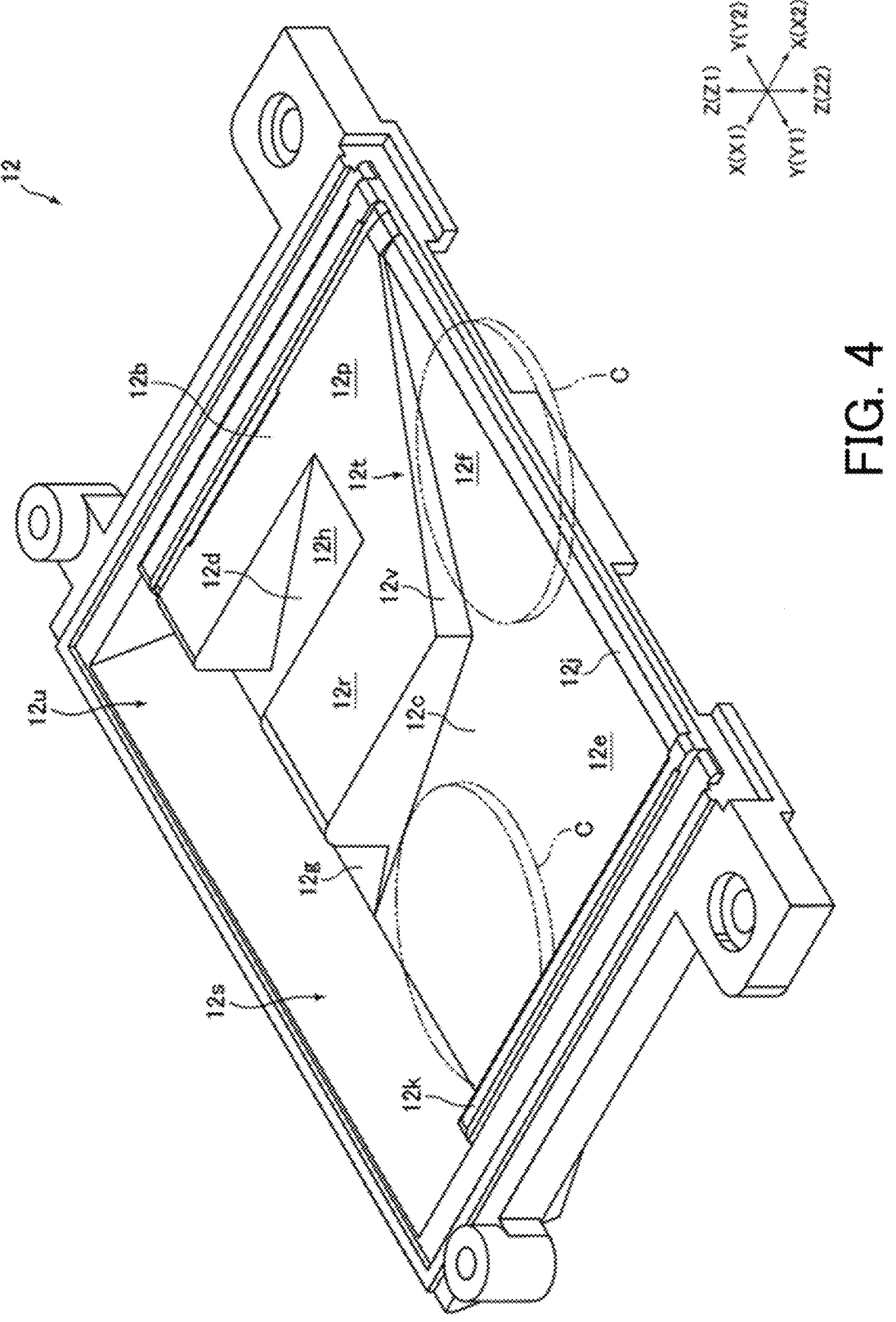
FIG. 4 is a perspective view showing a second frame in FIG. 1.
Figure 5:
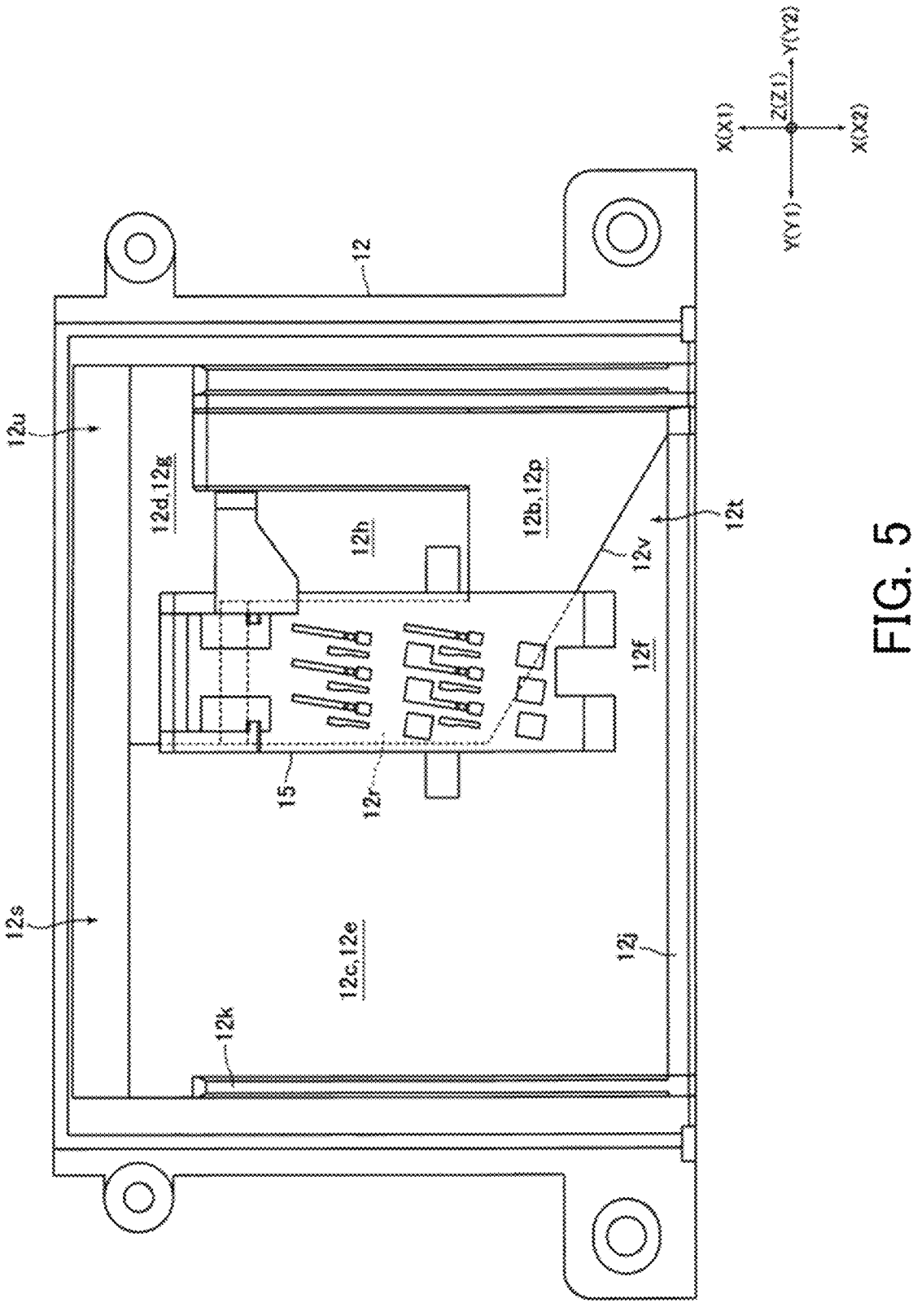
FIG. 5 is a plan view showing the second frame and a block main body in FIG. 1.

FIG. 4 is a perspective view showing the second frame 12 in FIG. 1. FIG. 5 is a plan view showing the second frame 12 and the block main body 15 in FIG. 1.

As described above, the main body frame 7 is structured of the first frame 11 which structures an upper side portion of the main body frame 7 and the second frame 12 which structures a lower side portion of the main body frame 7. As shown in FIG. 2, the first frame 11 is formed with a moving passage forming surface 11c which is an upper side face of the card moving passage 6. The moving passage forming surface 11c is a flat face which is perpendicular to the upper-lower direction. The second frame 12 is formed with a moving passage forming surface 12b which is a lower side face of the card moving passage 6. The moving passage forming surface 12b is a flat face which is perpendicular to the upper-lower direction.

The second frame 12 is formed with inclined faces 12c and 12d in a flat shape which are disposed on the lower side with respect to the moving passage forming surface 12b. In other words, the main body frame 7 is formed with the inclined faces 12c and 12d. The inclined faces 12c and 12d are inclined to the upper side as going to the front side. An inclination angle of the inclined face 12d is larger than an inclination angle of the inclined face 12c. The inclined face 12c is structured of a first inclined face part 12e which is disposed on a left side portion of the second frame 12 and a second inclined face part 12f which is disposed on a right and front side of the second frame 12. The inclined face 12d is structured of a first inclined face part 12g which is disposed on a right and rear side portion of the second frame 12 and a second inclined face part 12h which is disposed on the front side with respect to the first inclined face part 12g.

The first inclined face part 12e is formed between a rear end part of the second frame 12 and a front end part of the second frame 12. A shape of the first inclined face part 12e when viewed in the upper-lower direction is a rectangular shape whose long side is directed in the front-rear direction. The second inclined face part 12f is connected with a front side portion of the first inclined face part 12e and is disposed on the right side with respect to the first inclined face part 12e. As shown in FIG. 5, a width in the front-rear direction of the second inclined face part 12f is gradually narrowed as going to the right side. A shape of the second inclined face part 12f when viewed in the upper-lower direction is a right-angled triangle shape whose oblique side is disposed on the rear side.

A front end of the first inclined face part 12e and a front end of the second inclined face part 12f are disposed at the same position in the front-rear direction. The inclined face 12c is formed to a front end part of the second frame 12. In other words, the inclined face 12c is formed up to an end on the front side of the main body frame 7. A front end of the inclined face 12*c* is connected with a flat face 12*j* which is perpendicular to the upper-lower direction and whose width in the front-rear direction is narrow. The flat face 12*j* is disposed on a slightly lower side with respect to the moving passage forming surface 12*b*.

The first inclined face part 12*g* is disposed on the right side with respect to the first inclined face part 12*e*. A rear end of the first inclined face part 12*g* and a rear end of the first inclined face part 12*e* are disposed at the same position in the front-rear direction. Further, the rear end of the first inclined face part 12*g* and the rear end of the first inclined face part 12*e* are disposed at the same position in the upper-lower direction. A shape of the first inclined face part 12*g* when viewed in the upper-lower direction is formed in a substantially rectangular shape whose long side is directed in the left-right direction. A width in the left-right direction of the second inclined face part 12*h* is narrower than a width in the left-right direction of the first inclined face part 12*g*. The second inclined face part 12*h* is connected with a center part in the left-right direction of the first inclined face part 12*g*. A shape of the second inclined face part 12*h* when viewed in the upper-lower direction is a substantially rectangular shape whose long side is directed in the front-rear direction. The second inclined face part 12*h* is disposed on the rear side with respect to the second inclined face part 12*f*.

The moving passage forming surface 12*b* is provided with a first moving passage forming surface 12*k* which is disposed on the left side with respect to the first inclined face part 12*e* and a second moving passage forming surface 12*p* which is disposed on the right side with respect to the first inclined face part 12*e* and on the right and rear side with respect to the second inclined face part 12*f*. The second moving passage forming surface 12*p* is disposed on the front side with respect to the first inclined face part 12*g* and is disposed on both sides in the left-right direction and the front side with respect to the second inclined face part 12*h*. A front end part of the second moving passage forming surface 12*p* is disposed on the right side with respect to the flat face 12*j*.

A width in the left-right direction of the front end part of the second moving passage forming surface 12*p* which is disposed on the right side with respect to the flat face 12*j* is narrow. A portion of the second moving passage forming surface 12*p* which is disposed on the left side with respect to the second inclined face part 12*h* is a spring facing surface 12*r* for increasing contact pressure between the IC contact springs 8 and a card 3. The IC contact block 9 is disposed on the upper side with respect to the spring facing surface 12*r*. A left end face of the block main body 15 and a left end of the spring facing surface 12*r* are disposed at a substantially same position in the left-right direction.

A portion on the left side with respect to the first inclined face part 12*g* and the spring facing surface 12*r* is structured as an accommodation part 12*s* which is recessed from the moving passage forming surface 12*b* to the lower side. A boundary portion between the second moving passage forming surface 12*p* and the second inclined face part 12*f* is a guide part 12*t* for guiding a foreign matter inserted from the card insertion slot 4 to the accommodation part 12*s*. The foreign matter inserted from the card insertion slot 4 is, for example, a coin "C". A portion where the first inclined face part 12*g* is formed is an accommodation part 12*u* as a second accommodation part which is recessed from the moving passage forming surface 12*b* to the lower side. In other words, the main body frame 7 is formed with the accommodation parts 12*s* and 12*u* and the guide part 12*t*.

The accommodation part 12*s* is a storage space for storing a foreign matter inserted from the card insertion slot 4. The accommodation part 12*s* is disposed on the left side with respect to the IC contact block 9 when viewed in the upper-lower direction. In other words, the accommodation part 12*s* is disposed at a position displaced from the IC contact block 9 in the left-right direction. A portion of the first inclined face part 12*e* on the rear side with respect to the second inclined face part 12*f* structures a lower side face of the accommodation part 12*s*. In other words, a part of the inclined face 12*c* structures a lower side face of the accommodation part 12*s*. A width in the left-right direction of the accommodation part 12*s* is wider than a width in the left-right direction of the IC contact block 9. In this embodiment, a width in the left-right direction of the accommodation part 12*s* is about two times of a width in the left-right direction of the IC contact block 9. The accommodation part 12*u* is disposed on the rear side with respect to the spring facing surface 12*r* and is disposed on the rear side with respect to the IC contact block 9.

In this embodiment, as described above, the "Z2"-direction side (lower side) of the card reader 2 is substantially coincided with a lower side in a vertical direction (side where gravity acts), and the accommodation parts 12*s* and 12*u* are disposed on the lower side in the vertical direction with respect to a card 3 which contacts the moving passage forming surface 12*b*. Further, as described above, the first moving passage forming surface 12*k* is disposed on the left side with respect to the first inclined face part 12*e*, and the second moving passage forming surface 12*p* is disposed on the right side with respect to the first inclined face part 12*e*. In other words, the first moving passage forming surface 12*k* is disposed on the left side with respect to the accommodation part 12*s*, and the second moving passage forming surface 12*p* is disposed on the right side with respect to the accommodation part 12*s*.

As described above, a boundary portion between the second moving passage forming surface 12*p* and the second inclined face part 12*f* is formed as the guide part 12*t*, and a step surface between the second moving passage forming surface 12*p* and the second inclined face part 12*f* is formed as a guide surface 12*v*. In other words, the guide part 12*t* is formed with the guide surface 12*v* whose upper end part is connected with the moving passage forming surface 12*b* and whose lower end part is connected with the inclined face 12*c*. An upper end of the guide surface 12*v* is connected with the moving passage forming surface 12*b*, and a lower end of the guide surface 12*v* is connected with the inclined face 12*c*. The guide surface 12*v* is a flat face which is parallel to the upper-lower direction. The guide surface 12*v* is inclined toward the left side as going to the rear side when viewed in the upper-lower direction. In this embodiment, the guide surface 12*v* may be slightly inclined with respect to the upper-lower direction.

A width in the upper-lower direction of the guide surface 12*v* becomes gradually wider as going toward the rear side. A right end part of the guide surface 12*v* is disposed on the left side with respect to a right end part of the second moving passage forming surface 12*p*. Further, the right end part of the guide surface 12*v* is disposed on the right side with respect to a right end face of the block main body 15. In other words, the right end of the guide surface 12*v* is disposed on the left side with respect to the right end of the moving passage forming surface 12*b* and is disposed on the right side with respect to the right end face of the block main body 15.

Further, a front end part of the guide surface 12*v* (in other words, a front end part of the guide part 12*t*) is disposed on the front side with respect to a front end of the IC contact block 9. The guide surface 12*v* performs a function of guiding (leading) a foreign matter such as a coin "C" inserted from the card insertion slot 4 from the front side with respect to the IC contact block 9 to the accommodation part 12*s*. In other words, a foreign matter such as a coin "C" can be guided by the guide part 12*t* from the front side with respect to the IC contact block 9 toward the accommodation part 12*s*.

Principal Effects in this Embodiment

As described above, in this embodiment, the main body frame 7 is formed with the accommodation part 12*s* recessed to the lower side from the moving passage forming surface 12*b* which is a lower side face of the card moving passage 6, and the accommodation part 12*s* is disposed on the left side with respect to the IC contact block 9 when viewed from the upper side and is disposed on the lower side in a vertical direction with respect to a card 3 contacting the moving passage forming surface 12*b*. Further, in this embodiment, the main body frame 7 is formed with the guide part 12*t* for guiding a foreign matter inserted from the card insertion slot 4 to the accommodation part 12*s*, and the foreign matter can be guided from the front side with respect to the IC contact block 9 toward the accommodation part 12*s* by the guide part 12*t*.

Therefore, in this embodiment, even when a relatively large foreign matter such as a coin "C" is inserted from the card insertion slot 4, the foreign matter can be accommodated in the accommodation part 12*s* which is disposed at a position where hindrance hardly occurs in communication of data by the IC contact block 9, and clogging in the card moving passage 6 can be prevented by accommodating the foreign matter in the accommodation part 12*s*. Therefore, in this embodiment, even when a relatively large foreign matter is inserted from the card insertion slot 4, communication of data can be performed thereafter between the card reader 2 and a card 3. In other words, according to this embodiment, even when a relatively large foreign matter is inserted from the card insertion slot 4, a transaction of a card 3 thereafter can be continued in the card reader 2.

In this embodiment, a right end of the guide surface 12*v* is disposed on the left side with respect to a right end of the moving passage forming surface 12*b*. Further, in this embodiment, the first moving passage forming surface 12*k* which structures a part of the moving passage forming surface 12*b* is formed on the left side with respect to the first inclined face part 12*e*. Therefore, according to this embodiment, a rear end face of a card 3 which is moved along the card moving passage 6 toward the rear side can be prevented from being caught on the guide surface 12*v*. Accordingly, in this embodiment, even when the guide surface 12*v* for guiding a foreign matter inserted from the card insertion slot 4 to the accommodation part 12*s* is formed in the main body frame 7, a card 3 can be smoothly moved toward the rear side of the card reader 2.

In this embodiment, a width in the upper-lower direction of the guide surface 12*v* which is inclined to the left side as going to the rear side when viewed in the upper-lower direction is gradually wider as going to the rear side. Therefore, according to this embodiment, a foreign matter such as a coin "C" which is inserted from the card insertion slot 3 can be smoothly guided to the accommodation part 12*s* by the guide surface 12*v*.

In this embodiment, a part of the inclined face 12*c* in a flat face shape which is disposed on the lower side with respect to the moving passage forming surface 12*b* and is inclined toward the upper side as going to the front side structures a lower side face of the accommodation part 12*s*. Further, in this embodiment, the inclined face 12*c* is formed to an end on the front side of the main body frame 7. Therefore, according to this embodiment, a foreign matter inserted from the card insertion slot 4 can be slid along the inclined face 12*c* and is smoothly moved to the accommodation part 12*s*.

Further, in this embodiment, for example, when the card reader 2 is inclined in a predetermined direction, a foreign matter accommodated in the accommodation part 12*s* can be slid along the inclined face 12*c* and discharged to the outside of the card reader 2 from the card insertion slot 4. Further, for example, when a wire or the like is inserted from the card insertion slot 4 to engage and pull out a foreign matter, the foreign matter can be smoothly moved along the inclined face 12*c* to discharge the foreign matter from the card insertion slot 4 to the outside of the card reader 2. Therefore, according to this embodiment, a foreign matter accommodated in the accommodation part 12*s* can be easily discharged from the card reader 2.

In this embodiment, a width in the left-right direction of the accommodation part 12*s* is wider than a width in the left-right direction of the IC contact block 9. Therefore, according to this embodiment, in comparison with a case that a width in the left-right direction of the accommodation part 12*s* is not more than a width in the left-right direction of the IC contact block 9, a further large foreign matter can be accommodated in the accommodation part 12*s*. Further, in this embodiment, the moving passage forming surface 12*b* is provided with the first moving passage forming surface 12*k*, which is disposed on the left side with respect to the accommodation part 12*s*, and the second moving passage forming surface 12*p* disposed on the right side with respect to the accommodation part 12*s* and thus, even when the accommodation part 12*s* is formed in the main body frame 7, a card 3 can be smoothly moved in the card moving passage 6.

In this embodiment, the main body frame 7 is formed with the accommodation part 12*u* which is recessed from the moving passage forming surface 12*b* toward the lower side. Further, in this embodiment, the accommodation part 12*u* is disposed on the rear side with respect to the IC contact block 9 and is disposed on the lower side in a vertical direction with respect to a card 3 contacting the moving passage forming surface 12*b*. Therefore, according to this embodiment, dust and dirt entered from the card insertion slot 4 can be accommodated in the accommodation part 12*u* which is disposed at position where hindrance hardly occurs in communication of data performed by the IC contact block 9.

Other Embodiments

Although the present invention has been shown and described with reference to a specific embodiment, various changes and modifications will be apparent to those skilled in the art from the teachings herein.

In the embodiment described above, the main body frame 7 may be formed with no inclined face 12*d*. In this case, for example, a lower face of the accommodation part 12*u* is formed to be a flat face perpendicular to the upper-lower direction. Further, in this case, for example, it may be structured that no accommodation part 12*u* is formed. Further, in the embodiment described above, the main body frame 7 may be formed with no inclined face 12c. In this case, for example, instead of the inclined face 12c, the second frame 12 is formed with a flat face which is perpendicular to the upper-lower direction and is disposed on the lower side with respect to the moving passage forming surface 12b, and a lower face of the accommodation part 12s is formed to be a flat face perpendicular to the upper-lower direction. Further, a width in the upper-lower direction of the guide surface 12v is constant. In addition, in the embodiment described above, a width in the left-right direction of the accommodation part 12s may be not more than a width in the left-right direction of the IC contact block 9.

In the embodiment described above, the card reader 2 may include, instead of the torsion coil spring 10, a tension coil spring which biases the IC contact block 9 toward the retreat position 9B. Further, in the embodiment described above, the IC contact block 9 is guided between the contact position 9A and the retreat position 9B by the cam grooves 11b and the cam pins 16. However, the IC contact block 9 may be guided between the contact position 9A and the retreat position 9B by a parallel link mechanism.

In the embodiment described above, the card reader 2 may include, in addition to the IC contact block 9, a magnetic head which is capable of contacting a card 3 and at least reading magnetic data recorded in the card 3. In this case, the magnetic head is disposed on the front side with respect to the IC contact block 9. Further, the magnetic head is disposed on the right side with respect to the IC contact block 9. Further, the card reader 2 may include, instead of the IC contact block 9, a magnetic head. In this case, for example, the accommodation part 12s is disposed on the left side with respect to the magnetic head when viewed in the upper-lower direction.

In a case that the card reader 2 includes a magnetic head, it is structured that a foreign matter is capable of being guided from the front side with respect to the magnetic head toward the accommodation part 12s by the guide part 12t. Also in this case, similarly to the embodiment described above, even when a relatively large foreign matter is inserted from the card insertion slot 4, the card reader 2 is capable of continuing transactions of a card 3 thereafter. The magnetic head in this case is a data reading mechanism which contacts a card 3 and at least reads data recorded in the card 3. The card 3 is formed with a magnetic stripe in which magnetic data are recorded.

In the embodiment described above, the card reader 2 is a manual type card reader. However, the card reader 2 may be a card conveyance type card reader having a card conveyance mechanism which automatically conveys a card 3. In this case, a card conveyance passage corresponding to the card moving passage 6 is formed in an inside of the card reader 2. Further, in the embodiment described above, a PET (polyethylene terephthalate) card whose thickness is about 0.18-0.36 mm or a paper card having a predetermined thickness may be processed in the card reader 2.

Technical Structure

Embodiments of the present invention may be structured as follows.

(1) A card reader which includes a data reading mechanism which contacts a card and at least reads data recorded in the card, and a main body frame which is formed with a card moving passage where the card inserted from a card insertion slot is moved and holds the data reading mechanism, where when a direction perpendicular to a movement direction of the card which is linearly moved along the card moving passage and to a thickness direction of the card moved along the card moving passage is defined as a width direction of the card, one side in the movement direction of the card is referred to as a front side, an opposite side to the front side is referred to as a rear side, one side in the thickness direction of the card is referred to as a first thickness direction side, and an opposite side to the first thickness direction side is referred to as a second thickness direction side, the card is inserted into the card insertion slot from the front side toward the rear side, the main body frame is formed with a moving passage forming surface which is a face of the card moving passage on the first thickness direction side, an accommodation part which is recessed from the moving passage forming surface toward the first thickness direction side, and a guide part for guiding a foreign matter inserted from the card insertion slot to the accommodation part, the accommodation part is disposed at a position displaced from the data reading mechanism in the width direction of the card and is disposed on a lower side in a vertical direction with respect to the card contacting the moving passage forming surface, and the foreign matter is capable of being guided from the front side with respect to the data reading mechanism toward the accommodation part by the guide part.

(2) The card reader described in the above-mentioned structure (1), where the data reading mechanism is an IC contact block having a plurality of IC contact springs which are capable of contacting an external connection terminal of an IC chip formed in the card.

(3) The card reader described in the above-mentioned structure (1) or (2), where when one side in the width direction of the card is referred to as a first width direction side, and an opposite side to the first width direction side is referred to as a second width direction side, the accommodation part is disposed on the first width direction side with respect to the data reading mechanism when viewed in the thickness direction of the card, the guide part is formed with a guide surface which is inclined to the first width direction side as going to the rear side when viewed in the thickness direction of the card, an end part of the guide surface on the second thickness direction side is connected with the moving passage forming surface, and the end part on the second width direction side of the guide surface is disposed on the first width direction side with respect to an end part on the second width direction side of the moving passage forming surface.

(4) The card reader described in the above-mentioned structure (3), where the main body frame is formed with an inclined face in a flat face shape which is disposed on the first thickness direction side with respect to the moving passage forming surface and is inclined to the second thickness direction side as going to the front side, a part of the inclined face structures a side face of the accommodation part on the first thickness direction side, an end part of the guide surface on the first thickness direction side is connected with the inclined face, a width of the guide surface in the thickness direction of the card is gradually widened as going to the rear side, and the inclined face is formed to an end part on the front side of the main body frame.

(5) The card reader described in one of the above-mentioned structures (1) through (4), where a width of the accommodation part in the width direction of the card is wider than a width of the data reading mechanism in the width direction of the card.

(6) The card reader described in one of the above-mentioned structures (1) through (5), where when one side in the width direction of the card is referred to as a first width direction side and an opposite side to the first width direction side is referred to as a second width direction side, the moving passage forming surface is provided with a first moving passage forming surface which is disposed on the first width direction side with respect to the accommodation part and a second moving passage forming surface which is disposed on the second width direction side with respect to the accommodation part.

(7) The card reader described in one of the above-mentioned structures (1) through (6), where the main body frame is formed with a second accommodation part which is recessed from the moving passage forming surface toward the first thickness direction side, and the second accommodation part is disposed on the rear side with respect to the data reading mechanism and is disposed on the lower side in a vertical direction with respect to a card contacting the moving passage forming surface.

In this embodiment, for example, the data reading mechanism is an IC contact block having a plurality of IC contact springs which are capable of contacting an external connection terminal of an IC chip formed on a card. In this case, even when a relatively large foreign matter is inserted from a card insertion slot, communication of data can be performed between the card reader and a card thereafter.

In this embodiment, it is preferable that when one side in the width direction of the card is referred to as a first width direction side, and an opposite side to the first width direction side is referred to as a second width direction side, the accommodation part is disposed on the first width direction side with respect to the data reading mechanism when viewed in the thickness direction of the card, the guide part is formed with a guide surface which is inclined to the first width direction side as going to the rear side when viewed in the thickness direction of the card, and an end part of the guide surface on the second thickness direction side is connected with the moving passage forming surface, and the end part on the second width direction side of the guide surface is disposed on the first width direction side with respect to an end part on the second width direction side of the moving passage forming surface.

According to this structure, an end part on the second width direction side of the guide surface is disposed on the first width direction side with respect to an end part on the second width direction side of the moving passage forming surface and thus, a rear end face of a card moving along the card moving passage toward the rear side can be prevented from being caught on the guide surface. Therefore, even when a guide surface for guiding a foreign matter inserted from a card insertion slot to an accommodation part is formed in the main body frame, the card can be smoothly moved toward the rear side of the card reader.

In this embodiment, it is preferable that the main body frame is formed with an inclined face in a flat face shape which is disposed on the first thickness direction side with respect to the moving passage forming surface and is inclined to the second thickness direction side as going to the front side, a part of the inclined face structures a side face on the first thickness direction side of the accommodation part, an end part on the first thickness direction side of the guide surface is connected with the inclined face, a width of the guide surface in the thickness direction of the card is gradually widened as going to the rear side, and the inclined face is formed to an end part on the front side of the main body frame.

According to this structure, a part of the inclined face structures a side face on the first thickness direction side of the accommodation part and thus, a foreign matter inserted from a card insertion slot can be slid along the inclined face to smoothly move to the accommodation part. Further, according to this structure, when viewed in a thickness direction of a card, a width in the thickness direction of the card of the guide surface which is inclined to the first width direction side as going to the rear side is gradually widened as going to the rear side and thus, a foreign matter inserted from a card insertion slot can be smoothly guided to the accommodation part by the guide surface.

Further, according to this structure, for example, when the card reader is inclined in a predetermined direction, a foreign matter accommodated in the accommodation part can be slid along the inclined face and discharged from the card insertion slot to the outside of the card reader. Further, for example, when a wire or the like is inserted from the card insertion slot so that a foreign matter is engaged and pulled out, the foreign matter can be smoothly moved along the inclined face to discharge the foreign matter from the card insertion slot to the outside of the card reader. Therefore, a foreign matter accommodated in the accommodation part can be easily discharged from the card reader.

In this embodiment, it is preferable that a width of the accommodation part in the width direction of the card is wider than a width of the data reading mechanism in the width direction of the card. According to this structure, in comparison with a case that a width of the accommodation part in the width direction of a card is not more than a width of the data reading mechanism in the width direction of the card, a further large foreign matter can be accommodated in the accommodation part.

In this embodiment, it is preferable that when one side in the width direction of the card is referred to as a first width direction side and an opposite side to the first width direction side is referred to as a second width direction side, the moving passage forming surface is provided with a first moving passage forming surface which is disposed on the first width direction side with respect to the accommodation part and a second moving passage forming surface which is disposed on the second width direction side with respect to the accommodation part. According to this structure, even when the accommodation part which is recessed from the moving passage forming surface toward the first thickness direction side is formed in the main body frame, a card can be smoothly moved in the card moving passage.

In this embodiment, for example, the main body frame is formed with a second accommodation part which is recessed from the moving passage forming surface toward the first thickness direction side, and the second accommodation part is disposed on the rear side with respect to the data reading mechanism and is disposed on the lower side in a vertical direction with respect to a card contacting the moving passage forming surface. In this case, dust and dirt entered from the card insertion slot can be accommodated in the second accommodation part which is disposed at a position where hindrance hardly occurs in reading and the like of data by the data reading mechanism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:

a data reading mechanism which contacts a card and at least reads data recorded in the card; and a main body frame which is formed with a card moving passage where the card inserted from a card insertion slot is moved and holds the data reading mechanism;

wherein when a direction perpendicular to a movement direction of the card which is linearly moved along the card moving passage and perpendicular to a thickness direction of the card moved along the card moving passage is defined as a width direction of the card, one side in the movement direction of the card is referred to as a front side, an opposite side to the front side is referred to as a rear side, one side in the thickness direction of the card is referred to as a first thickness direction side, and an opposite side to the first thickness direction side is referred to as a second thickness direction side, the card is inserted into the card insertion slot from the front side toward the rear side;

the main body frame is formed with a moving passage forming surface which is a face of the card moving passage on the first thickness direction side, an accommodation part which is recessed from the moving passage forming surface toward the first thickness direction side, and a guide part for guiding a foreign matter inserted from the card insertion slot to the accommodation part;

the accommodation part is disposed at a position displaced from the data reading mechanism in the width direction of the card and is disposed on a lower side in a vertical direction with respect to the card contacting the moving passage forming surface; and the foreign matter is capable of being guided from the front side with respect to the data reading mechanism toward the accommodation part by the guide part.

2. The card reader according to claim 1, wherein the data reading mechanism is an IC contact block having a plurality of IC contact springs which are capable of contacting an external connection terminal of an IC chip formed in the card.

3. The card reader according to claim 1, wherein when one side in the width direction of the card is referred to as a first width direction side, and an opposite side to the first width direction side is referred to as a second width direction side, the accommodation part is disposed on the first width direction side with respect to the data reading mechanism when viewed in the thickness direction of the card, the guide part is formed with a guide surface which is inclined to the first width direction side as going to the rear side when viewed in the thickness direction of the card, and an end part of the guide surface on the second thickness direction side is connected to the moving passage forming surface, and the end part on the second width direction side of the guide surface is disposed on the first width direction side with respect to an end part on the second width direction side of the moving passage forming surface.

4. The card reader according to claim 3, wherein the main body frame is formed with an inclined face in a flat face shape which is disposed on the first thickness direction side with respect to the moving passage forming surface and is inclined to the second thickness direction side as going to the front side, a part of the inclined face structures a side face of the accommodation part on the first thickness direction side, an end part of the guide surface on the first thickness direction side is connected to the inclined face, a width of the guide surface in the thickness direction of the card is gradually widened as going to the rear side, and the inclined face is formed to an end part on the front side of the main body frame.

5. The card reader according to claim 1, wherein a width of the accommodation part in the width direction of the card is wider than a width of the data reading mechanism in the width direction of the card.

6. The card reader according to claim 1, wherein when one side in the width direction of the card is referred to as a first width direction side and an opposite side to the first width direction side is referred to as a second width direction side, the moving passage forming surface comprises a first moving passage forming surface which is disposed on the first width direction side with respect to the accommodation part and a second moving passage forming surface which is disposed on the second width direction side with respect to the accommodation part.

7. The card reader according to claim 1, wherein the main body frame is formed with a second accommodation part which is recessed from the moving passage forming surface toward the first thickness direction side, and the second accommodation part is disposed on the rear side with respect to the data reading mechanism and is disposed on the lower side in the vertical direction with respect to a card contacting the moving passage forming surface.

8. The card reader according to claim 2, wherein when one side in the width direction of the card is referred to as a first width direction side, and an opposite side to the first width direction side is referred to as a second width direction side, the accommodation part is disposed on the first width direction side with respect to the data reading mechanism when viewed in the thickness direction of the card, the guide part is formed with a guide surface which is inclined to the first width direction side as going to the rear side when viewed in the thickness direction of the card, and an end part of the guide surface on the second thickness direction side is connected to the moving passage forming surface, and the end part on the second width direction side of the guide surface is disposed on the first width direction side with respect to an end part on the second width direction side of the moving passage forming surface.

9. The card reader according to claim 8, wherein the main body frame is formed with an inclined face in a flat face shape which is disposed on the first thickness direction side with respect to the moving passage forming surface and is inclined to the second thickness direction side as going to the front side, a part of the inclined face structures a side face of the accommodation part on the first thickness direction side, an end part of the guide surface on the first thickness direction side is connected to the inclined face, a width of the guide surface in the thickness direction of the card is gradually widened as going to the rear side, and the inclined face is formed to an end part on the front side of the main body frame.

10. The card reader according to claim 2, wherein a width of the accommodation part in the width direction of the card is wider than a width of the data reading mechanism in the width direction of the card.

11. The card reader according to claim 2, wherein when one side in the width direction of the card is referred to as a first width direction side and an opposite side to the first width direction side is referred to as a second width direction side, the moving passage forming surface comprises a first moving passage forming surface which is disposed on the first width direction side with respect to the accommodation part and a second moving passage forming surface which is disposed on the second width direction side with respect to the accommodation part.

12. The card reader according to claim 2, wherein the main body frame is formed with a second accommodation part which is recessed from the moving passage forming surface toward the first thickness direction side, and the second accommodation part is disposed on the rear side with respect to the data reading mechanism and is disposed on the lower side in the vertical direction with respect to a card contacting the moving passage forming surface.

\* \* \* \* \*